H. G. AND R. I. KNAPP.
CLUTCH.
APPLICATION FILED MAR. 27, 1918.
1,326,066.
Patented Dec. 23, 1919.
2 SHEETS—SHEET 2.
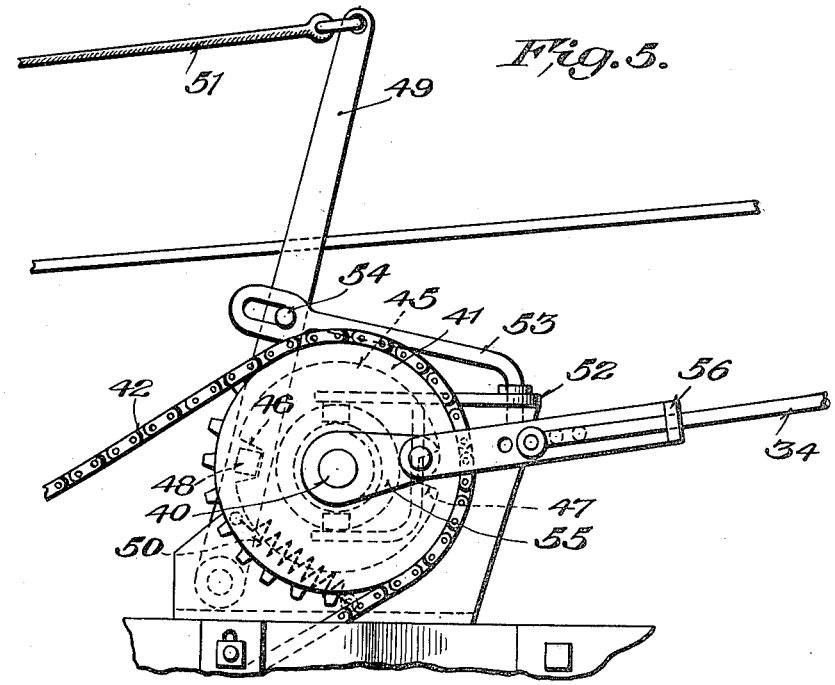
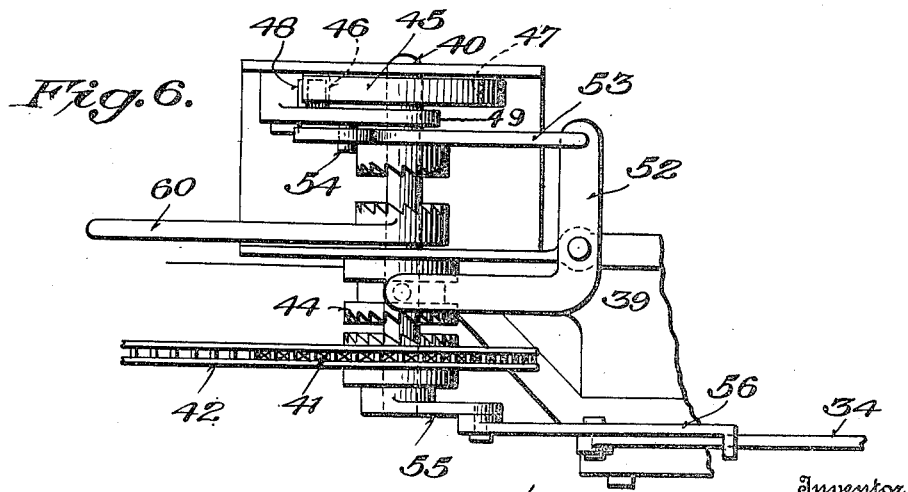

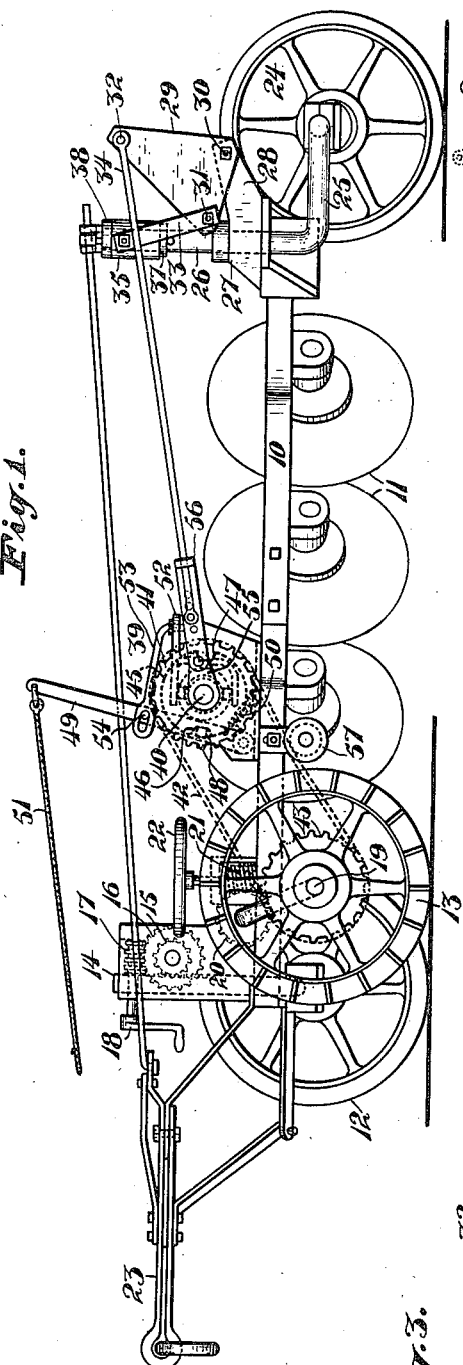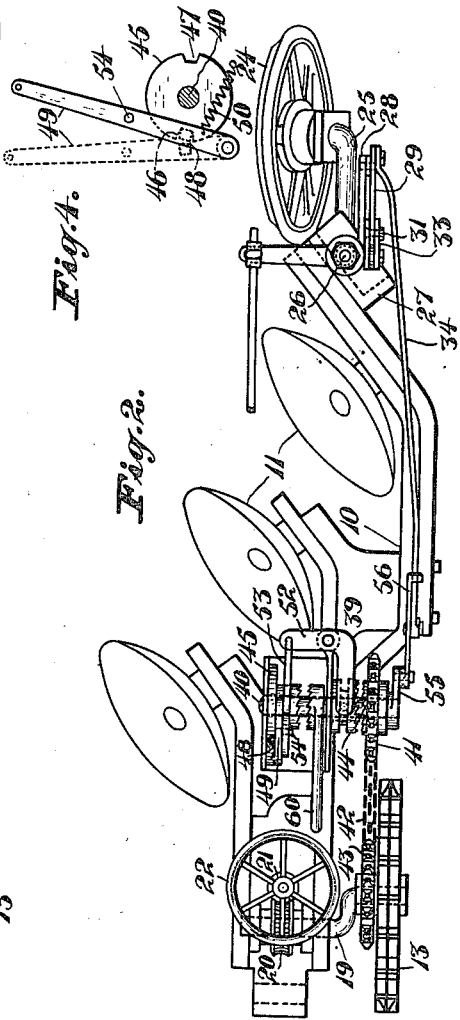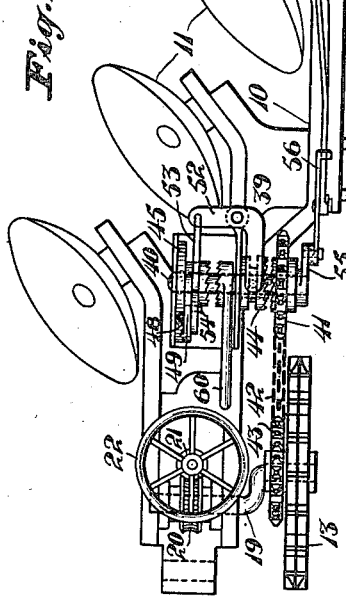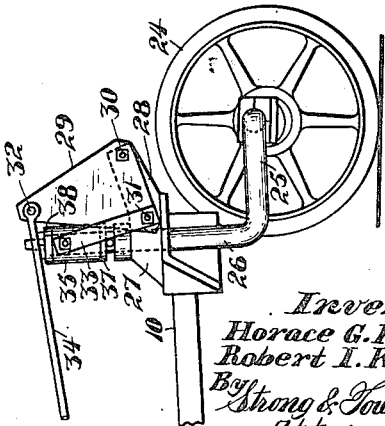

UNITED STATES PATENT OFFICE.

HORACE G. KNAPP AND ROBERT I. KNAPP, OF SAN JOSE, CALIFORNIA.

CLUTCH.

1,326,066.

Specification of Letters Patent.   Patented Dec. 23, 1919.

Application filed March 27, 1918. Serial No. 225,045.

*To all whom it may concern:*

Be it known that we, HORACE G. KNAPP and ROBERT I. KNAPP, citizens of the United States, residing at San Jose, in the county of Santa Clara and State of California, have invented new and useful Improvements in Clutches, of which the following is a specification.

This invention relates to a clutch and more particularly pertains to a clutch for power plow lifts.

The objects of the invention are to provide a clutch and operating means therefor in which the parts are of simple construction and compactly assembled and to also relate the parts in a novel manner so as to obtain a positive, quick and certain operation.

The invention is illustrated by way of example in the accompanying drawings, in which—

Figure 1 is a view in side elevation, illustrating a completely assembled plow equipped with the automatic power lift for the frame.

Fig. 2 is a view in plan, illustrating the plow as shown in Fig. 1 and further disclosing the lifting mechanism for the frame.

Fig. 3 is a fragmentary view of the rear end of the plow frame and the lifting mechanism provided to move it in relation to the trailer wheel.

Fig. 4 is a fragmentary view in section and elevation, illustrating the locking cam and the action of the releasing lever in relation thereto.

Figs. 5 and 6 are fragmentary enlarged views similar to Figs. 1 and 2, showing the clutch and associated parts.

Referring more in detail to the drawings, 10 indicates a horizontally extending plow frame, upon which are rotatably secured disk plows 11. This frame is supported at its forward end by wheels 12 and 13 which are separately mounted in relation to each other and are individually adjusted to dispose the frame at various heights above the ground. The wheel 12 is provided with a vertically extending shank 14, along one face of which a gear rack is formed. This rack is in mesh with a gear pinion 15, suitably rotated by a worm wheel 16 and a complementary gear 17. The complementary gear 17 is adapted to be actuated by a crank 18.

The wheel 13 is mounted upon a crank-shaft axle 19, so that it may be swung in relation to the frame by means of a worm wheel 20 and its worm 21. These gears are actuated by a horizontally disposed hand wheel 22. Thus when the crank 18 and the hand-wheel 22 are rotated the two wheels 12 and 13 will be moved toward and away from the frame. A suitable draw-bar connection 23 is secured to the forward end of the frame and affords a coupling for the plow with a tractor.

Mounted at the rear end of the frame 10 is a trailer wheel 24. This wheel is mounted upon a horizontally disposed spindle which is carried by a rearwardly extending extension 25. This extension is turned upwardly at its forward end to form a spindle 26. The spindle is rotatably secured within a bearing block 27 fixed to the rear end of the frame and thus provides a caster-like mounting for the trailer wheel. The bearing block 27 is formed with an arm 28 which is adapted to support an angle lever plate 29 by means of a pivot bolt 30. The lever plate 29 is triangular in shape and it is provided with pivot pins, one pin being provided for each of its three corners. The pivot bolt 30 affords a fulcrum point for the lever, while the pivot pins 31 and 32 provide connections for a shackle bar 33 and a draw-bar 34, respectively. The shackle bar 33 extends upwardly and is pivotally connected to a freely mounted sleeve 35 upon the upper end of the spindle 26.

Suitable collars 37 and 38 are disposed upon the spindles and upon opposite sides of the sleeve to fix the sleeve against longitudinal movement in relation to the spindle. The draw-bar 34 extends forwardly and may be actuated by various means to swing the triangular lever 29 and to thus raise or lower the frame in relation to the trailer wheel and the ground.

In this instance the draw-bar is actuated by a special control mechanism 39, with which the present invention is particularly concerned. This mechanism consists of a transversely extending jack-shaft 40 which is rotatably mounted within suitable bearings upon the frame 10 and at a point between the wheels 13 and 24. Secured on one end of the shaft is a sprocket wheel 41, around which a sprocket chain 42 passes to a complementary sprocket wheel 43, rotatably secured upon the axle spindle of the front wheel 13 and fixed to rotate therewith. It will be understood that the sprockets 41 and 43 are in alinement and that rotation of the wheel 13 will produce similar rotation of the jack-shaft 40. The sprocket 41 is normally disconnected from the jack-shaft and adapted to rotate freely thereon and may be operatively connected therewith by means of a sliding clutch member 44 which is formed with a clutch face adapted to engage a similar face upon the hub of the sprocket 41. The clutch member 44 is, of course, splined to the jack-shaft and will insure that the sprocket and shaft will rotate in unison when the clutch faces are in engagement. Mounted upon the opposite end of the jack-shaft is a lock cam 45. This cam is secured to constantly rotate with the jack-shaft and is substantially circular in configuration.

In the present instance locking recesses 46 and 47 are formed in the diametrically opposite edges of the cam and are adapted to be engaged by a locking stud 48. This stud is fixed to the side of a control lever 49, through the movement of which the mechanism is initially actuated. The control lever extends substantially vertical and is pivoted from the frame at a point in front of the jack-shaft. A coil spring 50 engages this lever and normally draws it rearwardly to cause the stud 46 to constantly bear against the periphery of the locking cam.

A suitable cable connection 51 is fastened at the free upper end of the control lever 49 and is carried to the tractor where it may be rigid to draw the lever forwardly. A bell-crank 52 is pivotally mounted in a horizontal plane above and in the rear of the jack-shaft and is provided to shift the clutch sleeve 44 when the control lever 49 is drawn to its extreme forward position. The crank is fitted with a shifting yoke upon its forwardly extending arm which engages a groove in the clutch sleeve 44, while its opposite arm is fitted with a connection 53 extending forwardly to engage a pin 54 upon the control arm. This pin extends through an elongated slot in the member 53 and thus allows the lever 49 to have movement in relation thereto, so that the locking cam 45 may be initially released before the shifting of the clutch.

The jack-shaft directly actuates the mechanism connected with the rear wheel by means of a crank arm 55 secured to the end of the shaft. The draw-bar 34 is pivotally secured to this arm and is provided with an adjusting plate 56, by which the length of the draw-bar may be determined and which will also regulate the vertical movement of the plow frame in relation to the ground. It will be understood that the rotation of the jack-shaft when in its engaged position will cause the crank arm to swing and thus reciprocate the draw-bar and raise the rear end of the frame.

In order that the sprocket chain may be held tight irrespective of the distances between the axis of the jack-shaft and axle spindle of the wheels 13, an adjustable idling roller 57 is secured to the frame and provided with vertical adjustment, whereby the slack in the chain may be taken up or released as occasion requires.

In operation, the front end of the frame may be adjusted by the movement of the crank 18 and the wheel 22. The movement of the crank 18 will cause the frame to be raised or lowered in relation to the wheel 12, while the movement of the wheel 22 will cause the wheel 13 to swing upon its crank-shaped axle and be moved toward or away from the frame. These operations are performed manually and insure that the machine will be set permanently. As the plow is being drawn forwardly the control lever 49 may be pulled by the cable 51. This will initially move the stud 46 from register with one of the peripheral grooves in the cam 45 and will thereafter cause the pin 54 to encounter the end of the slot of the connecting member 53. Further forward movement of this lever will swing the bell-crank 52 and cause the clutch sleeve 44 to become engaged with the sprocket wheel 41. This will connect the sprocket with the jack-shaft and as the plow moves forwardly will insure that rotation of the wheel 13 will produce simultaneous rotation of the jack-shaft. As the jack-shaft rotates the crank 55 will be swung forwardly and will draw upon the bar 34. This will cause the rear end of the frame to be drawn upwardly by the swinging movement of the lever plate 29 as it is suspended from the sleeve 35.

When in its extreme position the links and the lever plate will be disposed, as particularly shown in Fig. 3. It is customary, in the operation of the machine, to instantly release the pull upon the cable 51, after the mechanism has been set in motion. This will allow the spring 50 to hold the stud 46 against the periphery of the cam and insures that it will fall into the next recess which it encounters. In the present instance this would mean that the lock cam 45 would swing a half of a revolution and that thereafter the jack-shaft would simultaneously be released from the rotary action of the sprocket 41 and locked by the engagement of the stud 46 with the groove, When it is desired to lower the frame the same movement of the control lever 49 will release the cam and again set the jack-shaft in motion. This will cause the crank 55 to complete its cycle of operation and lower the frame.

In case the plow becomes inoperative or strikes an obstruction which it cannot overcome, the control mechanism may be manually operated by means of a lifting lever 60 which is mounted upon the jack-shaft and is provided to be brought into positive engagement with the shaft when desired, it normally being idle in relation thereto.

It will thus be seen that the lifting mechanism here disclosed may be set in motion by a simple control movement, which, when successively performed, will cause the frame to be raised and lowered by power as the plow moves along the ground.

While we have shown the preferred form of clutch for our power lift for plows, it will be understood that various changes in the construction, combination and arrangement of parts may be made by those skilled in the art without departing from the spirit of the invention as claimed.

It will be further understood that the jack-shaft mechanism may be located at any convenient point upon the plow frame and arranged with the crank lever fixed at any point upon the shaft, as desired.

Having thus described our invention, what we claim and desire to secure by Letters Patent is—

1. In combination with driving means including a shaft, means to rotate the shaft, a clutch on the shaft, a horizontal pivoted bell crank having one arm operatively connected to the slidable member of the clutch, a pivoted lever, adjacent the shaft, means controlled by the lever to lock the shaft against rotation, and a lost-motion connection extending over the shaft and disposed between the lever and the other arm of the bell crank whereby to allow the lever to first unlock the shaft and upon further movement thereof to move the slidable member of the clutch into operative position.

2. In combination with a driving shaft, a clutch thereon, a disk on the shaft having spaced notches in its periphery, a vertical spring tensioned lever having a projection engageable in the disk notches, to hold the disk and thereby the shaft against rotation, a horizontally disposed bell crank having one arm connected to the slidable member of the clutch, a link extending over the shaft and pivoted to the other arm of the bell crank, and a pin and slot connection between said link and the lever to allow the latter to first move its projection out of the disk notch and to then actuate the clutch.

3. In combination with a driving shaft, a clutch thereon, means on the shaft to lock same against rotation, a lever in front of the shaft having a member to engage said locking means, an operating member connected to the slidable member of the clutch and pivoted to the rear of the shaft, a connecting member extending over the shaft and disposed adjacent an intermediate point on the lever and connected to said operating member, and a pin and slot connection between said lever and said connecting member whereby to allow the lever to first move the member thereon out of engagement with said locking means and to then actuate said operating member of the slidable clutch member.

4. In combination with a driving shaft, and a clutch thereon, a locking member on the shaft, a lever to one side of the shaft having means engageable with said locking member to lock the shaft against rotation, a pivoted member for actuating the slidable member of the clutch, a connecting member secured to the pivoted member and extending horizontally over the shaft, and a direct lost-motion connection between the lever and the connecting member whereby to allow the lever to first move to release the locking member and to then actuate said pivoted member.

5. In combination with a driving shaft, a clutch thereon, a disk on the shaft having spaced notches in its periphery, a vertical lever arranged in front of the shaft and having a projection engageable in the disk notches, a spring for tensioning the lever to normally hold the projection thereof in one of the disk notches, a horizontally disposed bell crank pivoted to the rear of the shaft and having one arm thereof overlying the shaft and connected to the slidable member of the clutch, a link pivoted to the other arm of the bell crank and overlying the shaft and having its outer end overlying an intermediate point on the lever, and a pin and slot connection between said outer end of the link and said lever.

In testimony whereof we have hereunto set our hands in the presence of two subscribing witnesses.

HORACE G. KNAPP.
ROBERT I. KNAPP.

Witnesses:
 GEO. LEAMAN,
 VEVA M. LYMAN.